United States Patent [19]

Fridh et al.

[11] Patent Number: 4,830,140
[45] Date of Patent: May 16, 1989

[54] PERFORATED SOUND ABSORBING PANEL

[75] Inventors: Lars Fridh, Sjöbo; Stig Ingemansson, Mölndal, both of Sweden

[73] Assignee: Gyproc AB, Sweden

[21] Appl. No.: 162,564

[22] Filed: Mar. 1, 1988

[30] Foreign Application Priority Data

Mar. 2, 1987 [SE] Sweden ............................ 8700858

[51] Int. Cl.[4] .............................................. E04B 1/82
[52] U.S. Cl. ................................... 181/288; 181/286; 181/293; 181/294
[58] Field of Search ..................... 181/286, 291-293, 181/288, 294

[56] References Cited

U.S. PATENT DOCUMENTS

| 1,972,592 | 9/1934 | Jacobson | 181/292 |
| 3,693,750 | 9/1972 | Takkunen | 181/286 X |
| 4,313,524 | 2/1982 | Rose | 181/291 |
| 4,487,794 | 12/1984 | Brown et al. | 181/291 X |
| 4,671,841 | 6/1987 | Stephens | 181/292 X |

FOREIGN PATENT DOCUMENTS

| 0085863 | 1/1983 | European Pat. Off. |
| 857271 | 11/1952 | Fed. Rep. of Germany |
| 318117 | 1/1957 | Sweden |
| 440524 | 8/1985 | Sweden |

Primary Examiner—B. R. Fuller
Attorney, Agent, or Firm—Wegner & Bretschneider

[57] ABSTRACT

A perforated panel having a thickness of at least about 6 mm, for use as a sound absorbing element, especially at lacunarias. Each perforation is covered by a thin fiber cloth which is bonded to the edges of the perforation, rendering said panel element a specific acoustic flow resistance of between 1200 and 4000 $Nsm^{-3}$.

6 Claims, 1 Drawing Sheet

PERFORATED SOUND ABSORBING PANEL

FIELD OF THE INVENTION

The present invention relates to a perforated panel, having a thickness of at least about 6 mm, for use as a sound absorbing element, especially at lacunarias.

BACKGROUND OF THE INVENTION

There are various building regulations and personnel safety requirements concerning sound absorption to consider for different types of premises. Various types of panels have been made with the intention of giving a large amount of sound absorption. For instance, there are perforated panels which are used together with a back layer of mineral wool. Those combinations give an excellent sound adsorption, but in most cases only within a small limited range of frequencies. In special premises like auditoriums, theaters, etc. different areas are provided with absorbents having different active frequency ranges for fine adjustment of reverberation time. Such a partial area may have a large absorption within a small range of frequencies, or a special frequency absorption diagram.

In most premises such as large workshops, assembly halls and lobbies, etc. the entire ceiling area is normally panelled with only one type of absorbent. It is better if this has moderately good absorption in a large range of freqencies, rather than a very good absorption within a small range of frequencies.

A common type of absorbent is a lacunaria hanging in special carrier systems or pendulums and forming a surface for a thick layer of loose mineral wool.

When these kinds of ceilings are assembled, it is very important that the mineral wool is correctly positioned, in order to reach the intended absorption effect. Electrical lines and ventilation channels are often passed within the space between the ceiling and the lacunaria. During maintenance jobs on these systems, parts of the lacunaria has to be taken down and there is always a risk that the mineral wool is not properly returned to its position by an electricity or ventilation technician. Perforated panels are also known, wherein the back of the panel has a loosely laying or partially bonded sheet of cloth, instead of the mineral wood. This measurement results in a simplified assembly and adjustment, but not in a more efficient absorption.

It is more difficult to get a broad band absorbent with perforated panels of plasterboard and other building boards, than with the alternative, more expensive panels of metal and plastics. The reason for this is that the latter can be made with much less thickness. These thin panels will, however, after repainting have a considerably reduced ability to absorb sound, since paint can adhere to the cloth.

There is a clear need for widening the range of sound absorbing frequencies considerably for perforated plasterboard.

Three parameters have to be considered when a good sound absorption in a wide range of frequencies is desired.

1. The extent of perforation, which has to be as large as possible.
2. The thickness of the panel, which has to be as small as possible.
3. The distance (gap) between the primary ceiling and the lacunaria, which has to be large.

What are the implications for these three parameters?

1. Thin panels of metal or plastics may be perforated to a degree of about 30%. With plasterboard, in order to maintain strength, a perforation degree of more than 20% is not possible.
2. Panels of metal or plastics are available in thicknesses of less than 2 mm, whereas the plasterboards have a thickness of between 6 and 18 mm.
3. With thin panels having a large degree of perforation, good absorption may be obtained with gaps from 30 mm and upwards. To obtain similar data for plasterboard, a minimal gap of 70 mm is necessary. In both cases the absorption range of frequencies is improved considerably when the gap is increased to about 200 mm. Thereafter the improvements are minimal.

When all parameters 1-3 are favorable, broad band absorbents may be obtained with mineral wool and loosely fastened, thin cloth on the panel.

For plasterboard, parameters 1 and 2 have always been unfavorable, and so far, no method is known to obtain good absorption in a board frequency range.

The Swedish patent applications SE No. 402 142, SE No. 404 540, SE No. 407 957 and SE No. 440 524 and West German application DE No. 3 242 940 relates to resonance absorbents having a thin fibre cloth instead of a layer of mineral wool, but in all of these prior art documents it is emphasized that the fibre cloth should be fixed to a very thin perforated panel, e.g. of a thin metal plate. In those cases a desirable specific flow resistance is given for the perforated panel with cloth, it is about 500 Nsm$^{-3}$. These absorbents are therefore best suited when a large absorption near the resonance frequency is desired, rather than a broad band absorption.

For the sound absorbing baffle wall according to SE No. 404 540, a value of 400 Nsm$^{-3}$ is given as suitable for obtaining a maximum absorption in the frequency range of 500-1000 Hz where the intensity of the traffic noise is largest.

SUMMARY OF THE INVENTION

The object of the invention is therefore to obtain a perforated panel, e.g. of plaster, which has a suitable acoustic flow resistance, so that it may be used as a broad band absorbent without a back layer of loose mineral wool.

For this object, the invention is characterized in that each perforation is covered by a thin fibre cloth which is bonded to the edges of the perforation, rendering said panel element a specific acoustic flow resistance of between 1200 and 4000 Nsm$^{-3}$ (acoustic ohms).

Other characteristics will be clear from the accompanying claims.

BRIEF DESCRIPTION OF THE DRAWINGS

A perforated panel embodying the invention will now be described, by way of example only, with reference to the accompanying drawings, in which.

DESCRIPTION OF A PREFERRED EMBODIMENT

Figure 1:
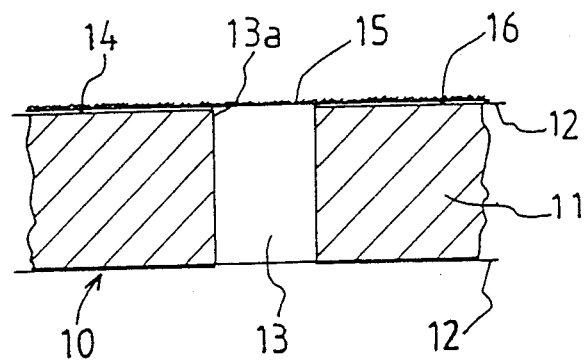
FIG. 1 is a section through a perforated panel according to the invention.

The acoustic flow resistance may be compared to an alternating current resistance. Not before 1985, a method to measure this dynamic resistance was presented: "Measurements of acoustic flow resistance". K.U. Ingård and T.A. Dear, Journal of Sound and Vibration (1985) 103(4). In the development of the present invention, this 103(4) method has been used.

The data on flow resistance which can be found in literature, compare with direct current resistance. This is much easier to measure but can differ a lot from the acoustically correct.

The panel 10 has been produced from plaster 11, which as with conventional plasterboard, is surrounded by a paper layer 12.

The panel 10 is perforated with holes or slits 13, extending transversely to the panel plane, through both plaster and paper layers. The back side 14 of the panel, i.e. the side of the panel which is intended to be turned away from a source of sound, has a bonded fibre cloth 15 covering the slits 13. The cloth is bonded to the panel 10 all the way to the edges 13a of the perforations, via a film of glue 16. Those parts of the cloth covering the perforations lack glue 16. When this panel 10 is correctly mounted, there is an air gap between the back side 14 and a ceiling or a behind wall.

When broad band sound absorbents are rated according to Swedish Standard SS No. 025259 and SS No. 025260, it has not been considered so important to insist on good absorption at low frequencies as at high, and a reduction in absorption is allowed below 500 Hz.

Figure 2:
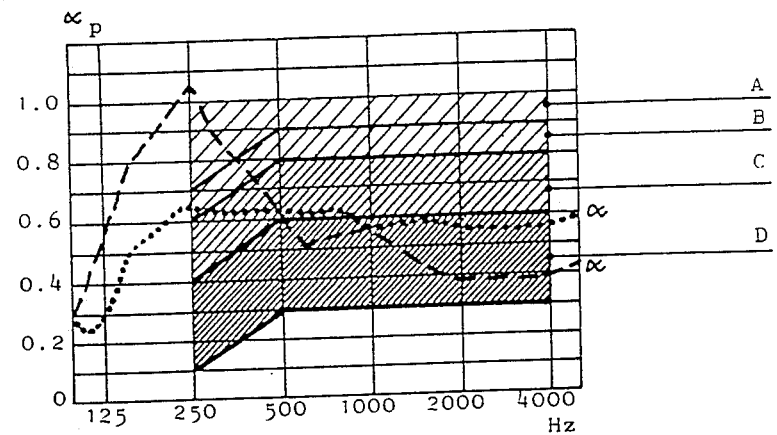
FIG. 2 is a diagram showing reference graphs and the absorption graph for a plasterboard according to FIG. 1.

In FIG. 2, both the absorption graphs of a slit perforated plasterboard absorbent with a behind layer of 30 mm mineral wool, and a corresponding plasterboard with a bonded layer of fibre cloth according to the invention, i.e. rendering the element a specific acoustic flow resistance of 3150 $Nsm^{-3}$, has been superimposed upon the reference graphs of the above mentioned Swedish Standard specification. In both cases the degree of perforation 17.8%, the thickness of the plasterboard is 13 mm and the air gap to a behind surface is 200 mm.

Both measurements were done at the National Swedish Research Laboratory.

The absorbent with the fibre cloth according to the invention and no mineral wool, is one grade above the conventional panel combined with mineral wood, Absorbent Grade C and Grade D respectively.

The weighted absorption factors $\alpha\omega$ are 0.6 and 0.4 respectively.

One example of a suitable fibre cloth material contains between 5 and 90% organic man-made fibres, e.g. polyester fibre, and the balance comprise cellulose fibre. The size of the fibre should be in the range of 1.7-17 dtex and the length between 12 and 35 mm. A latex binding agent may be used in the production of the fibre cloth, but also other thermic, mechanical or chemical binding agents. The cloth should have a substance of about between 20 and 300 g/m.

The invention is not limited to the above described embodiments, but several modifications are possible within the scope of the embodying claims. For example, two panels according to the invention may be laminated together, wherein the cloth may be situated between the adjoining panel sides. Further, the panels do not have to be plasterboard, but they may consist of other panels of similar thickness and perforation, e.g. wood fibre board or cement based panels.

What We claim is:

1. A sound absorbing element, comprising:
   a solid panel having a thickness of at least about 6 mm, a front sound-receiving side, a rear side opposing said front sound-receiving side, and a plurality of perforations extending through said panel from said front side to said rear side; and
   at least one thin fiber cloth which is bonded to said rear side of the panel at respective edges of each of said perforations so as to cover each of said perforations;
   wherein said sound absorbing element has a specific acoustic flow resistance of between 1200 and 4000 $Nsm^{-3}$.

2. The sound absorbing element as claimed in claim 1, wherein a single fiber cloth covers the entire rear side of said panel and is bonded to the panel by a glue.

3. The sound absorbing element as claimed in claim 2, wherein said glue extends to the edges of said perforations, but does not extend over the portions of the fiber cloth which cover the perforations.

4. The sound absorbing element as claimed in claim 1, wherein said sound absorbing element has a specific acoustic flow resistance of between 1800 and 3500 $Nsm^{-3}$.

5. The sound absorbing element as claimed in claim 1, wherein the area of said perforations constitutes between 10 and 20% of the area of said panel.

6. The sound absorbing element as claimed in claim 1, wherein said panel is made of plasterboard.

* * * * *